US009657655B2

(12) United States Patent
Frey

(10) Patent No.: US 9,657,655 B2
(45) Date of Patent: May 23, 2017

(54) ACTUATION DEVICE FOR CONTROLLING THE POWER OF AN INTERNAL COMBUSTION ENGINE AND METHOD FOR CONTROLLING THE POWER OF THE INTERNAL COMBUSTION ENGINE

(76) Inventor: Thilo Frey, Köln (DE)

( * ) Notice: Subject to any disclaimer, the term of this patent is extended or adjusted under 35 U.S.C. 154(b) by 402 days.

(21) Appl. No.: 13/880,261

(22) PCT Filed: Oct. 24, 2011

(86) PCT No.: PCT/EP2011/068515
§ 371 (c)(1),
(2), (4) Date: Apr. 18, 2013

(87) PCT Pub. No.: WO2012/055804
PCT Pub. Date: May 3, 2012

(65) Prior Publication Data
US 2013/0211696 A1    Aug. 15, 2013

(30) Foreign Application Priority Data

Oct. 25, 2010 (DE) .................. 10 2010 042 895

(51) Int. Cl.
*F02D 13/00* (2006.01)
*F02D 31/00* (2006.01)
(Continued)

(52) U.S. Cl.
CPC ............ *F02D 31/001* (2013.01); *B60K 26/02* (2013.01); *F02D 31/006* (2013.01); *F02D 31/009* (2013.01); *F02D 45/00* (2013.01)

(58) Field of Classification Search
CPC ...... F02D 45/00; F02D 31/001; F02D 31/006; F02D 31/009; B60K 26/02; B60K 41/02;
(Continued)

(56) References Cited

U.S. PATENT DOCUMENTS 6,350,217 B1 * 2/2002 Unterforsthuber ... B60T 13/585
477/174
6,536,408 B1 * 3/2003 Warner .................. B60T 7/042
123/323
(Continued)

FOREIGN PATENT DOCUMENTS

EP          2536585 A1 * 12/2012
WO      WO03029039 A1    4/2003
(Continued)

OTHER PUBLICATIONS

Crolla, David, and Mashhadi, Behrooz. Vehicle Powertrain Systems : Integration and Optimization. Hoboken, NJ, USA: John Wiley & Sons, 2011. ProQuest ebrary. Web. Feb. 13, 2015.*
(Continued)

*Primary Examiner* — Mahmoud Gimie
(74) *Attorney, Agent, or Firm* — International IP Law Group, PLLC

(57) ABSTRACT

The subject innovation relates to a control device for controlling the power of an engine, whereby the control device has a control range in which—with the drive train closed—neither a drive torque nor a braking torque is introduced, as well as to a control device for controlling the power of an engine, whereby the control device comprises a first control range in which the engine has a continuous braking torque, as a result of which the vehicle can be decelerated, and comprises a second control range in which the engine has a continuous drive torque, as a result of which the vehicle can be accelerated. In this process, assistance is provided for locating a third control range, whereby this third control range is situated between the first control range and the second control range.

12 Claims, 1 Drawing Sheet

(51) Int. Cl.
  *B60K 26/02* (2006.01)
  *F02D 45/00* (2006.01)

(58) Field of Classification Search
  CPC ... B60W 10/06; B60W 2540/12; B60W 10/02
  USPC .................. 701/110; 477/174, 183, 482, 513;
  123/319, 320, 321
  See application file for complete search history.

(56) References Cited

U.S. PATENT DOCUMENTS

| | | | | |
|---|---|---|---|---|
| 7,188,546 B2* | 3/2007 | Olofsson | .................. | B60T 7/04 |
| | | | | 477/211 |
| 8,525,656 B2* | 9/2013 | Saito | .................... | B60W 50/14 |
| | | | | 340/435 |
| 2004/0224817 A1* | 11/2004 | Graf | ....................... | B60K 6/485 |
| | | | | 477/5 |
| 2007/0192018 A1* | 8/2007 | Gibson | .................. | F02D 13/04 |
| | | | | 701/110 |
| 2007/0207892 A1* | 9/2007 | Dreibholz | ................ | B60K 6/48 |
| | | | | 477/8 |
| 2007/0246274 A1* | 10/2007 | Dreibholz | ............. | B60W 10/02 |
| | | | | 180/65.25 |
| 2011/0241865 A1* | 10/2011 | Saito | ..................... | B60W 50/14 |
| | | | | 340/439 |
| 2012/0059544 A1* | 3/2012 | Kinoshita | .......... | B60G 17/0164 |
| | | | | 701/22 |
| 2012/0220422 A1* | 8/2012 | Wurthner | ............. | B60W 10/02 |
| | | | | 477/79 |
| 2013/0211696 A1* | 8/2013 | Frey | ........................ | F02D 45/00 |
| | | | | 701/110 |

FOREIGN PATENT DOCUMENTS

WO          2009023916 A2      2/2009
WO   WO 2009023916 A2 *   2/2009   ................ B60T 8/32

OTHER PUBLICATIONS

International Preliminary Report on Patentability for PCT/EP2011/068515, dated Mar. 12, 2012 (German).
International Search Report for PCT/EP2011/068515, with English Translation, dated Dec. 13, 2011.

* cited by examiner

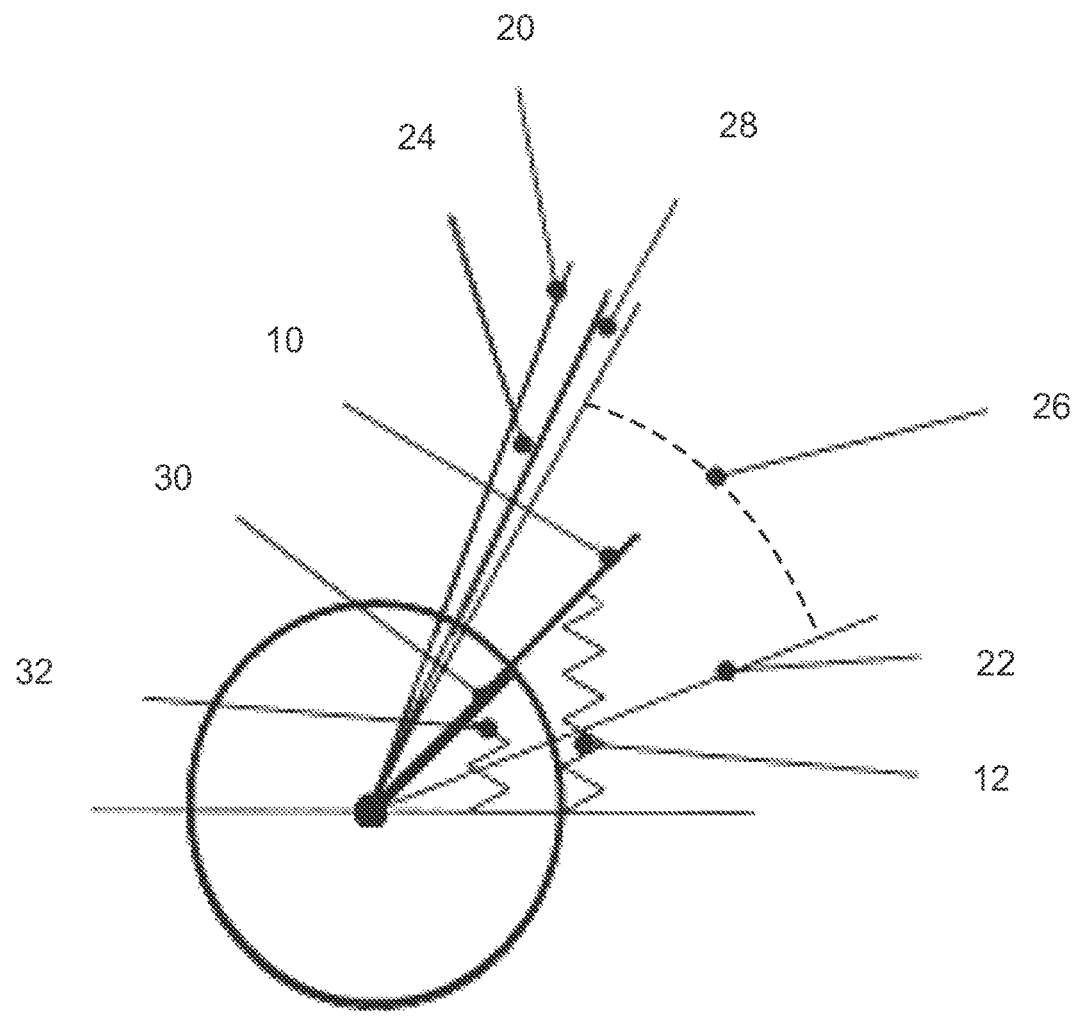

ACTUATION DEVICE FOR CONTROLLING THE POWER OF AN INTERNAL COMBUSTION ENGINE AND METHOD FOR CONTROLLING THE POWER OF THE INTERNAL COMBUSTION ENGINE

CROSS-REFERENCE TO RELATED APPLICATIONS

Pursuant to 35 U.S.C. §371, this application is the United States National Stage Application of International Patent Application No. PCT/EP2011/068515, filed on Oct. 24, 2011, the contents of which are incorporated by reference as if set forth in their entirety herein, which claims priority to German (DE) Patent Application No. 10 2010 042 895.7, filed Oct. 25, 2010, the contents of which are incorporated by reference as if set forth in their entirety herein.

BACKGROUND

In today's vehicles, the drive power of a vehicle is normally regulated by the accelerator pedal, whereby in modern vehicles, the connection between the accelerator pedal position and the engine load is generally no longer made by a direct mechanical coupling. As a rule, an electronic engine control unit regulates the engine load, taking various parameters into consideration such as, for example, the accelerator pedal position. When the accelerator pedal is continuously actuated starting from the zero position, the drive torque of an engine is continuously increased accordingly in that the control element responsible for the drive, e.g. the throttle valve in Otto engines, is actuated. In the zero position itself, no drive torque is transmitted, that is to say, the engine goes into overrun fuel cutoff operation, which results in so-called motoring reverse torque. With many of the modern accelerator pedal configurations, it is only possible to effectuate drive power via the engine, or to go to overrun fuel cutoff with the engine. The transition from one operating state to the other is abrupt and cannot be dosed.

German Preliminary Published Application DE 199 22 338 A1 describes a method for the production of a prescribed effective relationship between the actuation of the accelerator pedal and the resulting braking torque of a vehicle, whereby the possible adjustment range of the accelerator pedal is divided into at least two control ranges. A first control range is defined below a first prescribed angle of the accelerator pedal. In the first control range, actuators that can bring about a deceleration of the vehicle are regulated on the basis of a prescribed course of the braking torque. Preferably, the second control range is defined above a second prescribed angle of the accelerator pedal. Between the first and the second prescribed accelerator pedal angles, a third control range is defined in which the actuators, which can bring about a deceleration or an acceleration, are regulated in such a way that the braking torque or the drive torque of the vehicle is kept constant.

U.S. Pat. No. 7,188,546 B2 discloses an accelerator pedal unit for a vehicle, comprising an accelerator pedal that is functionally connected to a vehicle drive means, whereby the vehicle also has a separate brake pedal that is functionally connected to a vehicle braking means. When the accelerator pedal is moved out of an idle position into a driving position, the vehicle is caused to progressively increase the magnitude of the driving force. Here, the accelerator pedal is configured to operate over a predetermined pedal travel which spans from a resting position to the idle position and through to a driving position. Moreover, the accelerator pedal is functionally connected to the vehicle braking means, whereby the braking means causes the vehicle to progressively increase the magnitude of a braking force that is exerted on the vehicle when the accelerator pedal moves from the idle position to a resting position, whereby the braking means physically moves the brake pedal to a specific position that corresponds to the braking force exerted by the accelerator pedal unit, whereby the accelerator pedal is biased towards the resting position.

International patent application WO 2009/023916 A2 describes an accelerator pedal system and braking system for a vehicle, whereby the braking system responds to forces exerted on the accelerator pedal, whereby data that corresponds to the force exerted on the accelerator pedal is relayed to a control module, and whereby the braking force is influenced by the force exerted on the accelerator pedal.

In all of the systems described in the state of the art, an accelerator pedal position can be selected in which the engine exerts neither a drive torque nor a braking torque on the vehicle. However, this accelerator pedal position changes as the vehicle speed changes due to, for instance, the vehicle coasting, so that the driver would constantly have to readjust the accelerator pedal position in order to achieve an optimal energy utilization involving the lowest possible fuel consumption.

SUMMARY

The subject innovation relates to a control device for controlling the power of an engine. The subject innovation also relates to a method for controlling the power of an internal combustion engine.

The present subject innovation relates to a control device for controlling the power of an engine as well as to a method for controlling the power of an engine, especially of an internal combustion engine for a motor vehicle, whose speed can be regulated by a clutch and a brake with associated pedals as well as by an accelerator pedal.

The subject innovation is based on the objective of putting forward a method for controlling the power of the engine which achieves a reduction in fuel consumption.

Moreover, the subject innovation is based on the objective of putting forward a control device for carrying out the method.

The subject innovation provides a method for controlling the power of an engine, especially for controlling the power of an engine of a motor vehicle, in which assistance is provided for locating a previously defined operating state in which the engine—with the drive train closed—introduces a braking torque that, at the maximum, is less than the braking torque that is normally present when the engine brake is used, or else a drive torque that, at the maximum, does not lead to an acceleration of the vehicle, whereby, after the method has been activated by the automatic regulation of at least one parameter that influences the operating state of the engine, the optimal energy supply to the engine—which is needed in order to achieve the operating state in which the engine, with the drive train closed, introduces a braking torque that, at the maximum, is less than the braking torque that is normally present when the engine brake is used, or else a drive torque that, at the maximum, does not lead to an acceleration of the vehicle—is automatically determined and maintained for each rotational speed over a rotational speed range that lies between previously defined limits. The subject innovation also provides a control device for controlling the power of an engine for carrying out the method, which provides a first control range in which the engine has a continuous braking torque, as a result of which the vehicle can be decelerated, and provides a second control range in which the engine has a continuous drive torque, as a result of which the vehicle can be accelerated, whereby assistance is provided for locating a third control range, whereby this third control range is situated between the first control range and the second control range, and, in the third control range, the engine—with the drive train closed—introduces neither a braking torque nor a drive torque.

This comprises the case in which a braking torque and/or a drive torque is introduced, whereby the braking torque is considerably less than the braking torque in case of an engine brake, and in which the drive torque is considerably less than is required for an acceleration of a vehicle.

This preferably serves to prevent the engine electronic system from switching between a slight drive torque and a slight braking torque when the vehicle is coasting.

The subject innovation makes use of the known fact that the kinetic energy of the vehicle can be used more effectively through a kind of free-running function. This driving state is characterized, among other things, by the fact that the drive unit does not transmit any power to the wheels and thus neither drives nor brakes the vehicle. This is achieved, for example, with a centrifugal clutch, whereby the engine is autonomously uncoupled at a previously defined accelerator pedal position and is kept at the idling rotational speed. As a result, the vehicle can coast for a certain distance during which no fuel needs to be consumed. However, this free-running function has the drawback that no motoring reverse torque operation and thus no fuel savings are possible through an overrun fuel cutoff. Accordingly, in another already known method, the engine is uncoupled when the driver releases the accelerator pedal, whereby the driver can activate a motoring reverse torque operation by tapping the brake pedal or a pushbutton on the steering wheel. This has the drawback that a greater wear and tear occurs in the area of the brakes, since actuation of the brake is necessary in order to activate the engine brake. Moreover, a safety risk exists due to a possible load alteration that could arise in that, for instance, there is suddenly a need to brake in curves after all, and the engine brake is added in an uncontrolled manner to the desired braking force of the wheel brakes due to the uncoupling process. Moreover, tapping the brake pedal or the pushbutton on the steering wheel constantly requires an active decision on the part of drivers, which impairs their concentration.

Through the assistance provided for locating a third control range, the driver is given the possibility to optimally utilize not only the drive torque and the braking torque but also the kinetic energy of the vehicle. Thus, for example, if the car driver recognizes an obstacle or a traffic hindrance in time, the kinetic energy is utilized in such a way that the desired speed reduction is achieved by "coasting" without the effect of the engine brake or wheel brake and also without uncoupling, and thus with full positive engagement. In this manner, an unnecessary dissipation of energy due to the engine brake can be avoided and fuel can be saved, without the car driver being distracted by having to actuate an additional knob, lever or pushbutton. Moreover, the car driver has to make virtually no changes as compared to the original driving behavior so that there is no need for greater concentration on the part of the driver. The optimal utilization of the kinetic energy of the vehicle—with the drive train closed—is thus achieved without additional complicated mechanisms and is consequently low-wear, cost-effective and efficient.

Advantageously, the motor generates neither a braking torque nor a drive torque in the third control range with the drive train closed, so that, by using the third control range, the driver can optimally utilize the kinetic energy of the vehicle up to a certain threshold. Thus, for example, if the car driver recognizes an obstacle or a traffic hindrance in time, the movement energy can be utilized in such a way that the desired speed reduction is achieved by "coasting" without the effect of the engine brake or wheel brake and without uncoupling, and thus with full positive engagement. In this manner, an unnecessary dissipation of energy due to the engine brake can be avoided and fuel can be saved, without the car driver being distracted by having to actuate an additional knob, lever or pushbutton.

In an embodiment, the control device is a pedal and/or a lever or a knob, whereby the assistance according to the subject innovation can preferably be provided via a signal that is preferably acoustic, visual and/or tactile. The car driver thus receives a signal that can be emitted, for example, in the form of a soft tone and/or a small lit LED in the dashboard area of the vehicle and/or via a perceptible pressure point in the control device itself. In this manner, the car driver can easily perceive the assistance without being distracted from driving the car.

In an embodiment, the assistance can be provided mechanically, hydraulically, electromagnetically and/or pneumatically, so that various possibilities exist for providing the assistance.

In an advantageous embodiment of a control device according to the subject innovation, a pressure point that the driver can easily perceive is provided at which the energy supply is blocked to such an extent that no engine brake effect occurs. Thus, for example, the pressure point can be effectuated by an additional spring, which has the advantage that the movement course up to now is not changed and so a driver who is not familiar with the control device according to the subject innovation can nevertheless drive the car without any difficulty. Moreover, in this manner, the third control range can be quickly located, so that even over short distances, the movement energy can be utilized easily, quickly, safely and nevertheless efficiently.

According to the subject innovation, the above-mentioned engine is an engine from the group of internal combustion engines, electric motors, steam engines, Stirling engines and/or Wankel engines and/or a combination of the listed engines such as, for instance, a hybrid drive. In this manner, the present subject innovation can be used for controlling the power of an engine, especially for controlling the power of an engine for a motor vehicle. In general, however, the present subject innovation can be utilized in all engines that have to move masses such as, for example, in various industrial installations, ships and/or industrial vehicles, as long as it is advantageous to utilize the existing movement energy accordingly. Thus, in an industrial installation in which a motorized movement of masses is carried out, for example, over a certain distance, it is conceivable to terminate the movement, for example, by an automatic, timely activation of the free-running function until the destination is reached. Thus, the existing movement energy can be utilized instead of dissipating it, for example, by a brake such as, for instance, an engine brake. For this purpose, the control device for the engine has to be expanded by the function "free-running function".

According to the subject innovation, the specific gear types employed in the engines such as, for example, an automatic transmission, a semi-automatic transmission, or a manual transmission, can be adapted in such a way that all of the advantages of the inventive control device and/or power control of the engine can be utilized. By using already known engines and utilizing elements that are already present, the subject innovation can make do without additional and complicated mechanisms and it can be employed with all known motorized devices, regardless of the particular type of transmission.

In an embodiment, the control device is a pedal and/or a lever and/or a knob, whereby the control device has to be easy to recognize and simple to operate. Preferably, the control device can be an already known, built-in element such as, for example, an accelerator pedal and/or an operating element on the steering wheel, whereby however, it is also possible to use a newly installed operating element as the control device. Thus, it is conceivable to provide, for instance, a servo motor as the control device, that is coupled, for instance, to a navigation system. The assistance according to the subject innovation can preferably be provided via a signal that is preferably acoustic, visual and/or tactile. The car driver thus receives a signal that can be emitted, for example, in the form of a soft tone and/or a small lit LED in the dashboard area of the vehicle and/or via a perceptible pressure point in the control device itself. In this manner, the car driver can easily perceive the assistance without being distracted from driving the car.

In an advantageous embodiment of a control device according to the subject innovation, a pressure point that the driver can easily perceive is provided at which the energy supply is blocked to such an extent that no engine brake effect occurs. Thus, for example, the pressure point can be effectuated by an additional spring, which has the advantage that the movement course up to now is not changed and so a driver who is not familiar with the control device according to the subject innovation can nevertheless drive the car without any difficulty. Moreover, in this manner, the third control range can be quickly located, so that even over short distances, the movement energy can be utilized easily, quickly, safely and nevertheless efficiently.

According to the subject innovation, the engine introduces neither a drive torque nor a braking torque at the pressure point or in the third defined control range, independent of the speed stage, the gear ratio, the rotational speed and the clutch position, so that, independent of the above-mentioned parameters, the engine, with full positive engagement, does not transmit any force to the drive train of the vehicle and, in every driving situation, the movement energy that is present can be fully utilized when the third control range is reached and fuel can be saved. Fundamentally, a combination of the control device according to the subject innovation with currently known systems such as a rev limiter or cruise control is possible.

With the method according to the subject innovation for controlling the power of an engine, especially for controlling the power of an engine of a motor vehicle, at least one type of assistance is provided for locating a previously defined operating state in which the engine—with the drive train closed—introduces neither a braking torque nor a drive torque, or in which at least one type of assistance is provided when a control device for controlling the power of an engine is in a control range in which the engine has the previously defined operating state. Here, it is assumed that car drivers are provided with a third control range that they can utilize when they desire neither a drive torque nor a braking torque. Consequently, the third control range allows the car driver to let the vehicle coast, without a drive torque or a braking torque being introduced into the drive train. In this manner, an unnecessary dissipation of energy due to the engine brake can be avoided and fuel can be saved, without the car driver being distracted by having to actuate an additional knob, lever or pushbutton. For the car driver, the method according to the subject innovation does not entail any major changes as compared to the original driving behavior. The optimal utilization of the kinetic energy of the vehicle—with the drive train closed—is thus achieved without additional complicated mechanisms and is consequently low-wear, cost-effective and efficient. Moreover, thanks to the assistance provided, the driver can easily locate the third control range, whereby the third control range is defined to be precisely so large or so small that, during coasting, a fluctuation between driving and decelerating can be avoided and fuel can be saved.

In an embodiment of the method, the previously defined operating state is recognized by at least one sensor, so that a control system associated with the sensor provides at least one type of assistance for locating the previously defined operating state. Advantageously, the control system receives all of the important parameters via this at least one sensor such as, for example, the selected gear or the position of the automatic transmission, the current rotational speed and/or the idling speed, that are needed in order to regulate the engine. In this manner, the car driver can always receive assistance via the control system when the engine reaches the previously defined operating state in which the engine—with the drive train closed—introduces neither a braking torque nor a drive torque when the control device is in a third control range in which the engine is in a previously defined operating state. For this purpose, the appropriate parameters such as, for instance, the vehicle speed and/or the engine rotational speed are constantly monitored. Thus, the control system can provide assistance according to the subject innovation by a signal that the car driver can easily perceive and that is preferably acoustic, in the form of a soft tone, and/or visual, through a small lit LED in the dashboard area of the vehicle and/or tactile, for example, via a perceptible pressure point in the control device itself, whereby it has proven to be advantageous if the above-mentioned pressure point can be generated mechanically, hydraulically, electromagnetically and/or pneumatically.

It has proven to be especially advantageous for the control system to have a plurality of actuators that can effectuate a deceleration or an acceleration of the vehicle, so that, when the third control range is reached, various parameters are regulated in such a way that the kinetic energy of the vehicle can be utilized for as long as possible. Thus, for instance, the requisite fuel supply, which depends, among other things, on the speed of the moving vehicle, is correspondingly increased or decreased, or else the drive torque is reduced as far as possible, depending on with the driving situation in question and as a function of the gear that has been selected at that moment, in order to be able to utilize the kinetic energy of the vehicle for as long as possible. Moreover, the control system also regulates that, when the second control range is subsequently reached, the drive torque or the fuel supply is once again continuously increased, depending on the particular driving situation and as a function of the gear that has been selected.

When the vehicle leaves a highway, for example, an expressway, the state of coasting is generated in that the engine is changed to a state that essentially generates neither a drive torque nor a braking torque. This is preferably achieved by a systematic intervention in the electronic system of the engine.

The engine can be regulated by the control unit of the camshaft, the adaptation of the engine valve timing, by the regulation of the injection pressure or of the injection intervals in the case of multiple injections, by the control of the firing timing, or of the firing intervals in case of multiples firings, or by the regulation of firing, for example, in case of more than one spark plug per cylinder, whereby the use of the regulation can be made to be dependent on the operating state of the engine, for example, the engine or oil temperature.

Fundamentally, a combination of the present subject innovation with various already known methods is conceivable. Thus, for example, the method according to the subject innovation could be linked to a navigation system so that, for example, the drivers are always provided with assistance for locating the third control range when they approach a traffic obstacle such as, for example, a traffic light, an intersection, a highway exit or a reported traffic jam, and the movement energy of the vehicle would be just sufficient to reach that particular obstacle without any additional drive power or use of the engine brake or wheel brake. Once the assistance has been provided, the decision still lies with the drivers as to whether they would like to make use of the function and save fuel. By the same token, it is conceivable that the control device is automatically moved into the third control range, that is to say, by the control system, without the driver having to make this decision.

The subject innovation can also be used with a cruise control system or combined, for example, with a GPS-assisted autopilot. Thus, if a target speed is exceeded, it is not the overrun fuel cutoff that is actuated but rather the subject innovation instead. A bandwidth around the target speed can be specified (for example, ±5 km/h at a target speed of 130 km/h) within which only the subject innovation regulates the speed downwards. If the defined range is exceeded, for example, on a steep gradient, the overrun fuel cutoff is activated. As an alternative or together with the speed bandwidth, a bandwidth can also be defined for an acceleration of the vehicle caused, for instance, by a road gradient, within which the subject innovation is used to reduce or maintain the speed. The bandwidths can be defined differently at various speeds and conditions of use.

In addition, the subject innovation can also be combined with the principle of cylinder cutoff. Simultaneously with the cut-off cylinders, the valves can be kept closed. Furthermore, with more than one valve per inlet or outlet valve group, they can be regulated differently within the group.

The control unit can have different interfaces to the units that are to be regulated, for example, indirectly via other control units or a central control unit, or directly, for example, via a regulator for increasing or decreasing the injection, the air admixture or the adjusting mechanism of the camshaft, the firing or the electromechanical actuation of valves.

Signals from sensors (e.g. the position of the accelerator pedal, the rotational speed or the vehicle speed) can be detected and checked in the control unit. If these values or the combination of values or the result of an electronic processing procedure of values or a combination of values correspond to a specification that is stored in a memory in the control unit or that has been computed from current values or from a combination or the result of their linking, then the unit that is to be regulated is assigned a certain setting value via the interface (for example, a certain timing for a valve when the accelerator pedal is in the range of the free-running function at a certain rotational speed).

The prescribed values in the memory of the control unit can be fixed-programmed or can be variable through special interventions (e.g. diagnostic device or special software via a service interface) or can be influenced by the driver (e.g. selection of driving modes or of the accelerator pedal position).

The stored values can also be influenced or emitted by sensors or as a result of various processed values of software or of a fixed program. This means that they can be constantly subject to variation.

In the free-running range, the motor is regulated in such a way that at least one zero torque is present, i.e. a small positive torque is permitted, but not a negative one. Here, it can be provided, for instance, that the smallest possible torque amounting to, for example, 5% of the maximum torque of the motor is transferred to the drive train. This prevents a fluctuation of the torque around the zero point with deflections into the negative range as well as into the positive range. Such a fluctuation of the torque could give rise to uncomfortable driving states. For purposes of preventing this, the control unit for regulating the zero torque can be configured in such a way that, always starting from an at least positive torque, it regulates the engine with respect to the zero torque. This means that the term zero torque also includes a slight positive torque. If the driver moves the accelerator pedal from the overrun fuel cutoff range into the zero torque range, then the torque, coming from a negative torque, is regulated with respect to the zero torque. Here, exceeding the minimum torque, for example, by 0.5% of the maximum torque, should be avoided during the zero torque regulation, so that the engine does not constantly switch back and forth between a slightly positive torque and a braking torque in the overrun fuel cutoff range, when the driver—in order to control the deceleration—switches back and forth between the overrun fuel cutoff range and the zero torque or, if the zero torque range is absent, the drive range.

It can also be provided that the regulation is switched on, based on the individual selection of the driver.

The transition from the regulated range of the zero torque to a negative torque for the overrun fuel cutoff can be configured in such a way that the driver can dose it.

The regulation can also be configured in such a way that it is ruled out for certain rotational speed, speed or gear ratio conditions.

The subject innovation can also be carried out in such a way that, when the regulation is switched on with the accelerator pedal position in the "drive" range, at least the zero torque is transferred from the engine to the drive unit, i.e., there is definitely no braking torque present, irrespective of the pedal position within this range. The advantage of this embodiment is that a pressure point in the pedal or other signaling modalities are not necessary and can be dispensed with. Thus, an approval from the competent authorities could be easier to obtain. As soon as the condition "at least zero torque" has been reached, it is also conceivable to define a range that is at least dependent on the driven speed in order to define the position in which the accelerator pedal can be situated that corresponds to the zero torque, without causing the vehicle to accelerate and leave the zero torque range. The slower the driven speed, the smaller this speed-dependent range becomes. In this case, the vehicle is only accelerated when the accelerator pedal is moved beyond this range in the direction of the drive position. The advantage of this is that the driver can comfortably hold the state of zero torque. The range is deleted once it has been left and it is defined anew as soon as zero torque is once again present.

The subject innovation can also be carried out if a pressure point in the accelerator pedal or another indication that is easy for the driver to locate for displaying the zero torque position is not practicable or feasible. Here, the accelerator pedal characteristics can be divided conventionally into the two ranges of the overrun fuel cutoff and of the drive, without there being an indication of the transition from one range to the other. The zero torque regulation is always activated in the drive range when the accelerator pedal is at a place where less drive than the zero torque is being supplied. As soon as the accelerator pedal is at a position where the zero torque is exceeded, the drive is activated once again. Both regulations can occur although the accelerator pedal is in the same position, if, for instance, the vehicle is coming from a gradient slope and then drives up a hill. Therefore, the drive range is regulated in such a way that at least the zero torque always prevails there. Consequently, within defined rotational speed limits, a braking torque of the engine can never arise. If the driver releases the accelerator pedal in the drive range to such an extent that the value would fall below the zero torque, the regulation is activated and at least the zero torque is transmitted to the drive train.

BRIEF DESCRIPTION OF THE DRAWING

Below, the subject innovation will be explained in greater depth, making reference to the accompanying drawings. Additional advantages and embodiments can be gleaned from the claims. In the FIGURE, the following is shown: a schematic arrangement of a control device according to the subject innovation.

DETAILED DESCRIPTION OF SPECIFIC EMBODIMENTS

The control device according to the subject innovation shown in the FIGURE has a conventional pedal 10 that is used for controlling the power of an engine. The pedal 10 can be variably adjusted between a first end position 20 and a second end position 22 using a first spring element 12. Between these two end positions 20, 22, there is a first control range 24 in which the engine has a continuous braking torque, as a result of which a deceleration of the vehicle can be brought about, and a second control range 26 in which the engine has a continuous drive torque, as a result of which an acceleration of the vehicle can be brought about. Between these two control ranges 24, 26, there is a third control range 28 in which the engine has a previously defined operating state. This operating state could be precisely the operating point in which, when the drive train is closed, the engine generates neither a braking torque nor a drive torque. In order to make it easier to locate the third control range, the shown embodiment has a second auxiliary pedal 30 that is situated underneath the first pedal 10. In contrast to the pedal 10, the auxiliary pedal 30 is only variably adjustable using a second spring element 32 between the third control range 28 and the second end position 22, with the result that, when the pedal 10 is actuated in the first control range 24, only the first spring element 12 exerts a return force on the pedal 10. Once the pedal 10 reaches the third control range 28, the pedal 10 comes to rest directly on the auxiliary pedal 30, so that the return force of the second spring element 32 is added to the already present return force of the first spring element 12, resulting in assistance that is easy for the vehicle driver to ascertain in the form of an easily perceived pressure point for locating the third control range 28.

The drawing discloses and describes an embodiment by way of an example of the present subject innovation, but other connecting mechanical arrangements are likewise possible. The subject innovation is not limited to the embodiment described; the latter serves merely to illustrate the subject innovation.

What is claimed is:

1. A method for controlling the power of an engine, especially for controlling the power of an internal combustion engine for a motor vehicle, comprising:
regulating at least one parameter that influences an operating state of the engine;
providing assistance for locating a previously defined operating state in which a drive train of the engine is engaged with the engine,
wherein the previously defined operating state introduces a braking torque having a maximum that is less than the braking torque present if an engine brake is used; or
wherein the previously defined operating state introduces a drive torque having a maximum that does not lead to an acceleration of the vehicle;
determining an energy supply to provide to the engine to achieve the previously defined operating state; and
maintaining the energy supply for each rotational speed over a rotational speed range that lies between previously defined limits.

2. The method according to claim 1, wherein the previously defined operating state is recognized by at least one sensor, after which a control system associated with the sensor provides the assistance for locating the previously defined operating state.

3. The method according to claim 2, wherein a plurality of actuators effectuate a deceleration or an acceleration of the engine.

4. A control device having a first control range in which the engine has a continuous braking torque, as a result of which the vehicle can be decelerated, and having a second control range in which the engine has a continuous drive torque, as a result of which the vehicle can be accelerated, wherein assistance is provided for locating a third control range-situated between the first control range and the second control range, and, in the third control range a drive train of the engine is engaged with the engine and the engine introduces neither a braking torque nor a drive torque, comprising a means to automatically determine and maintain the optimal energy supply to the engine in order to maintain the operating state of the third control range for each rotational speed over a rotational speed range that lies between previously defined limits.

5. The control device according to claim 4, wherein the engine comprises:
an internal combustion engine;
an electric motor;
a steam engine;
a Stirling engine;
a Wankel engine; or
a combination of the listed engines.

6. The control device according to claim 4, wherein the control device comprises:
a pedal;
a lever;
a knob; or
any combination of the above.

7. The control device according to claim 4, wherein the assistance is provided via a signal.

8. The control device according to claim 7, wherein the signal comprises:
an acoustic signal;
a visual signal;
a tactile signal; or
any combination of the above signals.

9. The control device according to claim 4, wherein the assistance is provided mechanically, hydraulically, electromagnetically, pneumatically.

10. The control device according to claim 4, wherein the assistance is a previously defined pressure point.

11. The control device according to claim 4, comprising a plurality of actuators to effectuate a deceleration or an acceleration of the engine.

12. The control device according to claim 4, wherein the previously defined pressure point is effectuated by an additional spring.

* * * * *